United States Patent
Chiodo

[11] Patent Number: 5,934,495
[45] Date of Patent: Aug. 10, 1999

[54] PROTECTIVE FILM FOR CANS OR DRINK AND FOOD CONTAINERS IN GENERAL

[76] Inventor: Maurizio Chiodo, via del Molino a Vento, 86—Trieste, Italy

[21] Appl. No.: 08/863,244

[22] Filed: May 27, 1997

Related U.S. Application Data

[63] Continuation of application No. 08/397,749, Mar. 2, 1995, abandoned.

[30] Foreign Application Priority Data

Mar. 7, 1994 [IT] Italy ................. TS940003 U

[51] Int. Cl.⁶ .................................................. B65D 51/20
[52] U.S. Cl. .......................................... 220/257; 220/258
[58] Field of Search ................... 220/257, 258, 220/716, 730, 906; 215/251

[56] References Cited

U.S. PATENT DOCUMENTS

| | | | |
|---|---|---|---|
| 3,204,805 | 9/1965 | May ........................... | 220/257 |
| 3,214,074 | 10/1965 | Schechter ................... | 220/257 |
| 3,391,847 | 7/1968 | Christine et al. .......... | 220/257 |
| 3,438,533 | 4/1969 | Hanisch et al. ............ | 220/257 |
| 3,690,509 | 9/1972 | Kinoian et al. ............ | 220/716 |
| 3,905,511 | 9/1975 | Groendal ................. | 220/906 X |
| 4,708,257 | 11/1987 | Deline ....................... | 220/257 |
| 4,925,050 | 5/1990 | Yu .......................... | 220/906 X |
| 4,927,048 | 5/1990 | Howard ................. | 220/257 X |
| 5,108,003 | 4/1992 | Granofsky ................. | 220/257 |
| 5,119,955 | 6/1992 | Granofsky ................. | 220/270 |
| 5,139,163 | 8/1992 | Diaz ........................... | 220/258 |
| 5,292,022 | 3/1994 | Blanco ...................... | 220/257 |

*Primary Examiner*—Stephen K. Cronin
*Attorney, Agent, or Firm*—Bucknam and Archer

[57] ABSTRACT

Protective film for cans or drink and food containers in general, consisting of a thin layer from biodegradable plastic material, which wraps up the upper base of the can (2). The envelope (1) is easily removed by hand, thanks to simple tabs (3) provided along the circumference of the can (2) or on the upper face of the latter, or on the vertical symmetry plane of said can. The protective film solves the problem of dirt which builds up on cans when they are put up for sale and which enters the mouth when the can (2) is opened.

3 Claims, 2 Drawing Sheets

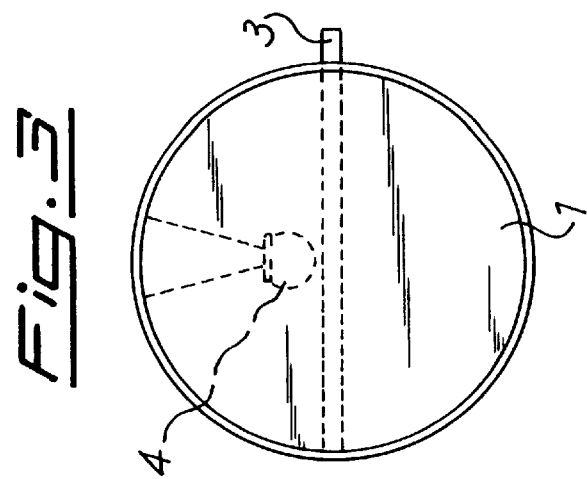
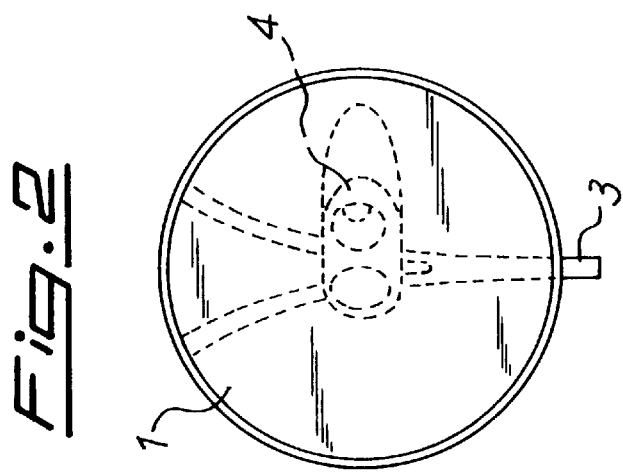
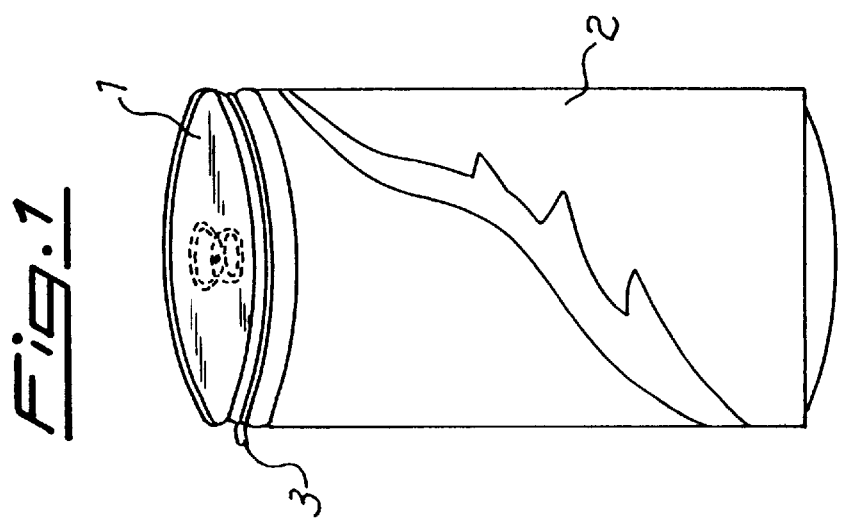

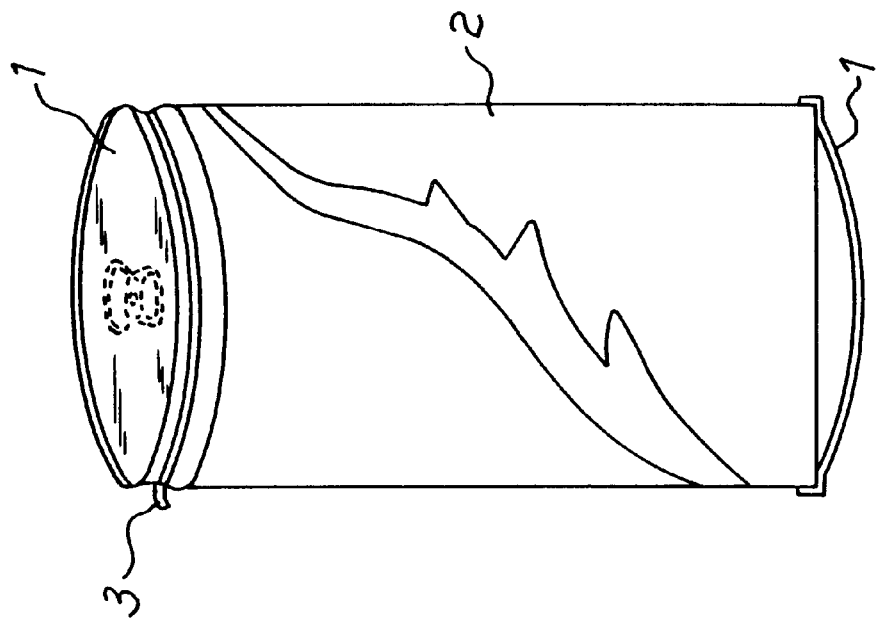
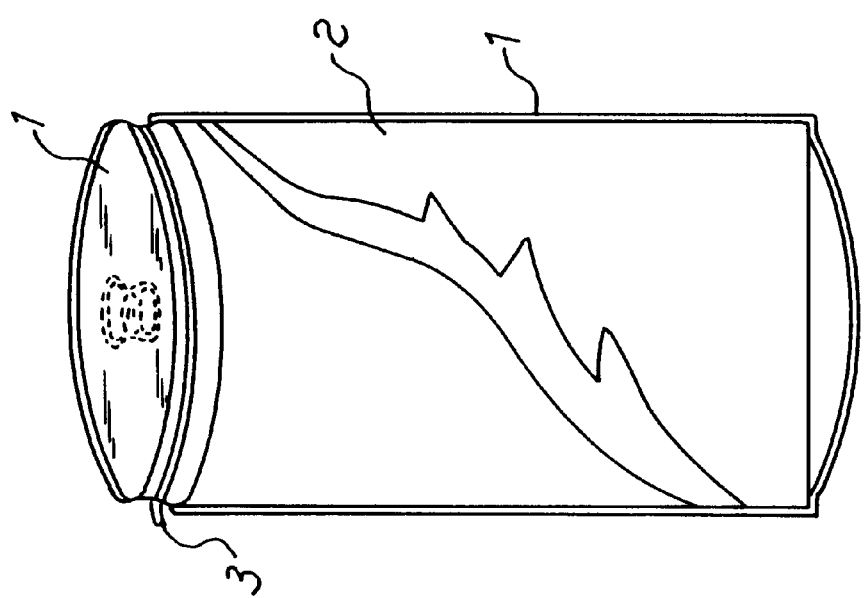

PROTECTIVE FILM FOR CANS OR DRINK AND FOOD CONTAINERS IN GENERAL

This is a continuation of application Ser. No. 08/397,749, filed Mar. 2, 1995, now abandoned.

BACKGROUND OF THE INVENTION

This invention relates to a protective film for cans or drink and food containers in general.

The protective film subject matter of this invention is suitable to be utilized in the alimentary field and, in particular, in the field of canned drinks, beer, cooking oils, meats and vegetables in general.

BACKGROUND OF THE PRIOR ART

As it is known, in these last decades, the sale of canned foodstuff has increased greatly. Especially in the case of sparkling soft drinks and beers, for volumes of less than half liter, this type of packing has replaced almost completely the traditional method of bottles from glass or plastic material.

Cans offer many advantages: easy production, storing and transport, almost impossible breaking, recycling of the utilized material.

There exists however a health problem. Cans are generally supplied in packages containing each 2 to 6 cans. Once cans have been taken out from the package, they are placed on the shelves of the shops or sale and/or refreshment outlets without any protection.

In this way, dust, more or less harmful micro-organisms and any kind of dirt settle on the exposed surfaces of the can. The same happens, although to a lesser extent, when cans are kept in houses, before consumption. Dust and impurities in general build up especially on the upper base of the can, and in particular along the contact line between the can base and its edge. The fluid which comes out from the container during the emptying absorbs and drags along between sips such dust and impurity particles, which enter therefore easily the mouth and pass from the mouth to the digestive system, with the consequence that they are sometimes harmful to the health.

Also the unaesthetic aspect of this packing system is obvious and causes a sense of disgust to the user who must put his or her lips in touch with a dirty container.

This problem is even worsened by the recent opening system utilized for soft drinks. This opening system comprises a snap-tab which is no longer snapped off but squashed in the inside of the metal container. In this way, all the aforementioned impurities flow directly into the drink contained in the can. Different types of caps are known in the art, whose main aim is to close the slot which forms in the can once the tab has been snapped off, so as to protect and preserve the organoleptic characteristics of the drink in time. These types of caps satisfy such aim, but they have the drawback of being rather expensive. Even though mass-produced from low-cost materials, they are nevertheless expensive for can (or foodstuff) producers. Besides, one should not forget the pollution which a high number of such protections would cause to the environment, taking into account the fact that they are made from resistant materials, having to be long-lasting, and that they have to be remarkably thick to resist the pressure exercised by carbon dioxide incorporated in the fluid.

Another type of known envelope is the film from plastic material which wraps up multiple sale packs (two or more cans). However, also this type of protection from dirt and micro-organisms has the drawback of a poor ecologicity. In fact, the film from plastic material utilized as an envelope has to be resistant and lasting, to allow can transport and preservation also for a rather long time.

SUMMARY OF THE INVENTION

The object of this invention is to solve the aforementioned problem. More particularly, the object of this invention is to realize a protection for cans having a very low cost and a relatively rapid degradation time.

A further object of this invention is to provide a protective envelope for cans with a method so simple as to allow firms producing drinks and food in general to apply directly said envelope during the packing stage, without burdening economically the final consumer, and with a sure image yield.

A further object of this invention is to provide the final purchaser of canned foodstuff with a protection capable of protecting it from the contact with impurities, dust, dirt and various micro-organisms.

According to this invention, these and still other objects are achieved by utilizing a thin protective film for cans of drink and food containers in general, consisting of a biodegradable plastic material, preferably transparent, applied on the base provided with an opening of the can or container.

The plastic material utilized for the protective film subject matter of this invention has an average duration of about three months in the presence of external bacterial and atmospheric agents (in particular, light and heat); while its duration is much longer if it is well protected from said bacterial and atmospheric agents. Between the protective film and the upper base of the can, an inert gas or chemical sanitizing substances not harmful for human health may be interposed.

The above film is applied on each can by means of any of the methods known today: by means of heat, by immersion or spraying, by means of a biodegradable melt composition, by means of vacuum methods, pressure methods, or non toxic glues, etc., during the can filling and/or closing cycle.

The film can be easily removed by hand, thanks to simple tabs or other easily utilizable means, obtained along the circumference of the can or on the upper face of same, or along its vertical symmetry plane or in any other position. The envelope may even have two or more opening systems.

The film may be applied on either the upper base of the can or on the part which comes in touch with the consumer's lips during the use or on both bases of the can, and it may also wrap up the can completely.

The protective film from biodegradable plastic material is insoluble and water-tight, and also impermeable to all bacteria which may be harmful for human health.

Any biodegradable and recyclable plastic material can be utilized for the production of the envelope or protective film subject mater of this invention. In particular, a material is preferred which is biodegradable, thermoplastic, self-supporting, adhesive and thermoretractable, to make its appplication easier. Besides, the protective film should preferably have a high modulus of elasticity; high ultimate tensile stress (stretching resistance of at least 50%); high abrasion resistance; high bending capacity and high tightness to water and micro-organisms.

Biodegradable and recyclable thermoplastic materials are will known on the market and are produced and sold by several companies. Such materials are generally based on starch or polyvinyl alcohol or degradable plastic materials.

Among the biodegradable thermoplastic materials and the relating kwown films, we mention, only by way of example:

the thermoplastic material constituted of biodegradable polyesters and maize starch, produced and sold by Novamont under the trade name MATER-BI$^R$;

the thermoplastic material constituted of 3-hydroxybutyrate and 3-hydroxyvalerate, produced and sold by Imperial Chemical Industries under the trade name BIOPOL$^R$; this material is described in patent WO 92/01733;

the biodegradable polyester based on polyethylene terephthalate (PET), copolymerized with cycloaliphatic diacids, described in patent WO 93/07197;

the biodegradable films described in U.S. Pat. No. 3,472,804, obtained by fusion of polymeric compositions comprising: polyvinl alcohol (with high, middle and low molecular weight), starch, preferably dextrin, formaldehyde polymers, preferably urea formaldehyde polymers, and a plasticizer;

the biodegradable films described in U.S. Pat. No. 3,949,145, obtained from aqueous solutions of poyvinyl alcohol, starch and glycerine, covered with a water-resistant polymer;

the biodegradable films described in WO 94/25493, composed by mixes of pectin and gelatinized starch;

the biodegradable films produced from raw material containing PIHT (sorgum, kemaf or cereals);

the biodegradable films described in patent WO 94/04600, based on vegetable raw materials (carbohydrates), such as potato starch, maize, bitter cassava, wheat, barley, sorgum, etc., and polysaccharides;

the biodegradable films applied by spraying and composed by a biodegradable thermoplastic polymer, such as polyethylene, polyamide, polyurethane, polyphospharenes, chitin, etc., and by an organic solvent such as acetone, ethylenglycol, propylenglycol, N-methyl-2-pyrrolidin, etc.;

the biodegradable films described in patent WO 93/12986, containing a hydrocolloid, such as an alginate, and an elastomer and/or cellulose fibers;

the biodegradable films described in U.S. Pat. No. 4,337,181, obtained by blowing a mix of starch and an ethylene-acrylic acid copolymer;

the biodegradable films described in Japanese patent 62-56481, based on polylactic acid, polyglycolic acid or poly-2-oxybutirric acid polymers;

the biodegradable films described in patent WO 94/13774, based on compositions containing starch and water, having an ultimate tensile strength of over 50%;

a mix of starch and an ethylene copolymer with vinyl acetate or methyl and/or ethyl acrylate, described in U.S. Pat. No. 5,087,650;

a polymeric composition consisting of an ethylene copolymer, a condensation product of starch and propylene oxide, an ethylene copolymer with vinyl acetate and a polyoxydric alcohol as dispersing agent and plasticizers; this composition is described In U.S. Pat. No. 5,234,987;

the biodegradable films described in U.S. Pat. No. 5,254,607, constituted of a mix of starch, an ethylene-acrylic acid or ethylene-vinyl alcohol copolymer and an aliphatic polyester;

the biodegradable films described in U.S. Pat. No. 4,133,784, based on starch and an ethylene-acrilic acid copolymer;

the biodegradable films based on polyvinyl alcohol and an ethylene, propylene, isobutene or styrene copolymer with acrylic acid, vinyl alcohol or vinyl acetate, described in patent WO 93/09171.

The mechanical properties of the biodegradable thermoplastic films containing starch can be improved by mono-axial or biaxial stretching.

Besides the aforementioned materials, other materials, such as for instance paper, may be utilized, provided that they are suitably treated to prevent dust, impurities and micro-organisms from passing through.

The films utilized for the protection of cans for drinks and food in general, subject matter of this invention, have a very thin thickness, preferably comprised between 1 micrometer and 0,5 mm.

BRIEF DESCRIPTION OF THE DRAWINGS

Further characteristics and advantages of this invention will be better understood from the following description, wherein reference is made to the figures of the attached drawing, which show special embodiments illustrated by way of preferred non limitative examples of the protective film for cans subject matter of this invention, and wherein:

FIG. 1 is a perspective view of a can containing a soft drink and provided with the protective film having the opening tab obtained along the circumference of the can;

FIG. 2 is a top view of the protective film provided with a second type of snap-tab;

FIG. 3 is a top view of the protective film provided with a third type of snap-tab;

FIG. 4 is a perspective view of a can containing a soft drink and provided with the protective film covering the entire can; and FIG. 5 is a perspective view of a can containing a soft drink and provided with the protective film covering both ends of the can.

DETAILED DESCRIPTION OF THE EMBODIMENTS

More particularly, envelope 1 consists of a thin film of biodegradable plastic material. The film is hot-applied on the surface to be protected of can 2, by immersion or by spraying. In the embodiment shown in the figures, the whole upper base of can 2 (i.e. the one provided with opening tab 4 in the case of soft drinks), including edges, is covered by the protective film 1.

Envelope 1 is provided with an opening snap-tab 3, obtained along the circumference of can 2, in the case shown in FIG. 1, or on the upper base of can 2, in the case of FIGS. 2 and 3, which allow an easy hand removal of film 1. The opening snap-tab 3 may be a transversal slip, as in FIG. 3, or a strip divided into two Y-shaped branches, as in FIG. 2.

Film 1 is applied on cap 2 directly by the producer or the packager. To drink or to eat the food contained in the can, the consumer snaps tab 3, removes envelope 1 and opens the slot obtained on the surface of can 2 through the usual tab 4.

In this way the surface of can 2 under the protective film 1 remains always clean and healthy.

Film 1, being made from biodegradable material, can be disposed of in any way, as after two-three months it destructs itself thanks to the external bacterial and atmoshperic agents. Alternatively, such film 1 may remain united to can 2 in one or two points, thanks to the presence of special glues (non biodegradable, such as silicone) that can be utilized to glue the film.

Between envelope 1 and can 2 any material may be inserted, such as, for instance, inert gases, disinfectants, gadgets, promotion leaflets, illustrations, receipes, etc.

FIG. 4 shows the envelope 1 covering the entire can 2 while FIG. 5 shows the envelope 1 covering the top and bottom ends of can 2.

Although this invention has been illustrated with reference to some embodiments shown in the attached figures, it is obvious that some modifications and alternatives may be introduced in its industrial realization, in the light of the above description. Hence, this invention covers any alternative and modification falling within the spirit and the protection scope of the attached claims.

I claim:

1. A protective coating for a can, adapted to sealingly contain solid or liquid edible products, said can having a cylindrical shape with a top circular surface and a bottom circular surface, said can including a lid portion adapted to be opened to expose said solid or liquid products, said protective coating comprising a thin film removably covering at least said lid portion of said can and having a thickness in the range of 1 micrometer to 0.5 mm, said thin film being formed of a biodegradable thermoretractable plastic material based on starch or polyvinyl alcohol having high abrasion resistance, high bending capacity, being substantially impervious to bacteria and moisture and being degradable in a period of two to three months when exposed to external bacterial agents, light and heat, said protective coating having means for removal from said lid wherein said top surface of said can has an edge and said means for removal of said protective coating is a snap-tab (3) located on said edge, and an inert gas interposed between said thin film and said lid portion of said can.

2. The protective coating according to claim 1 wherein said thin film also covers said bottom surface.

3. The protective coating according to claim 2 wherein thin film covers said can in its entirety.

* * * * *